Jan. 11, 1938.    W. F. M. EDWARDS    2,105,412
MANUFACTURE OF CIGARETTES
Filed Dec. 30, 1934    7 Sheets-Sheet 6
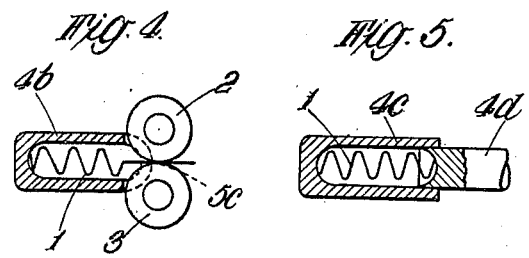
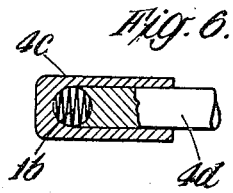
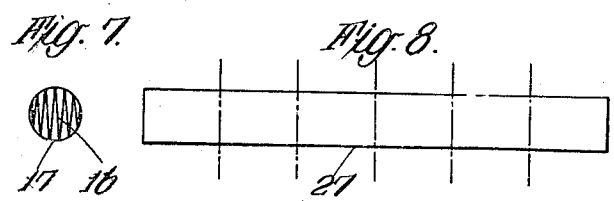
Inventor:
William F. M. Edwards
By
Attorney Patented Jan. 11, 1938

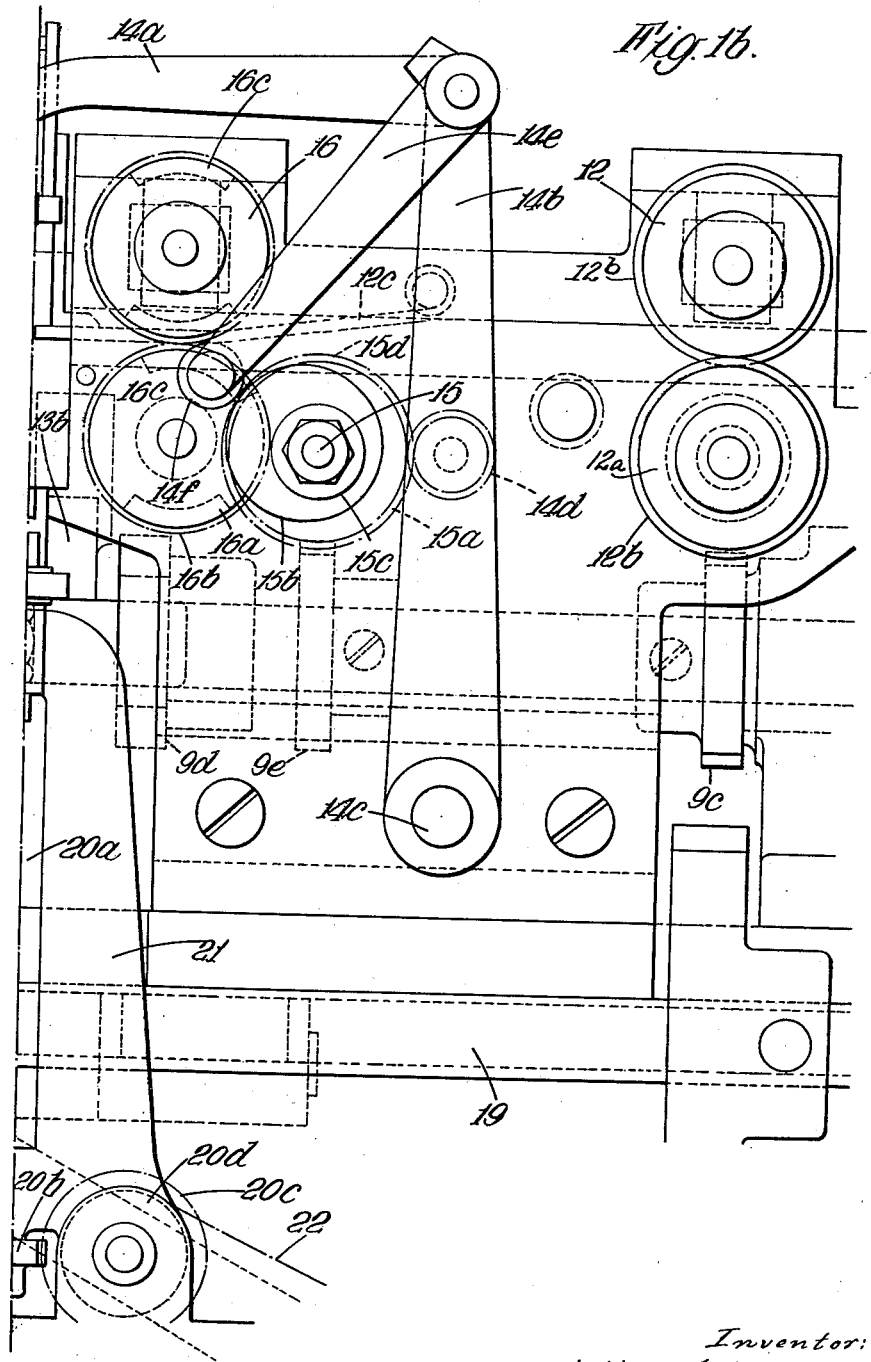

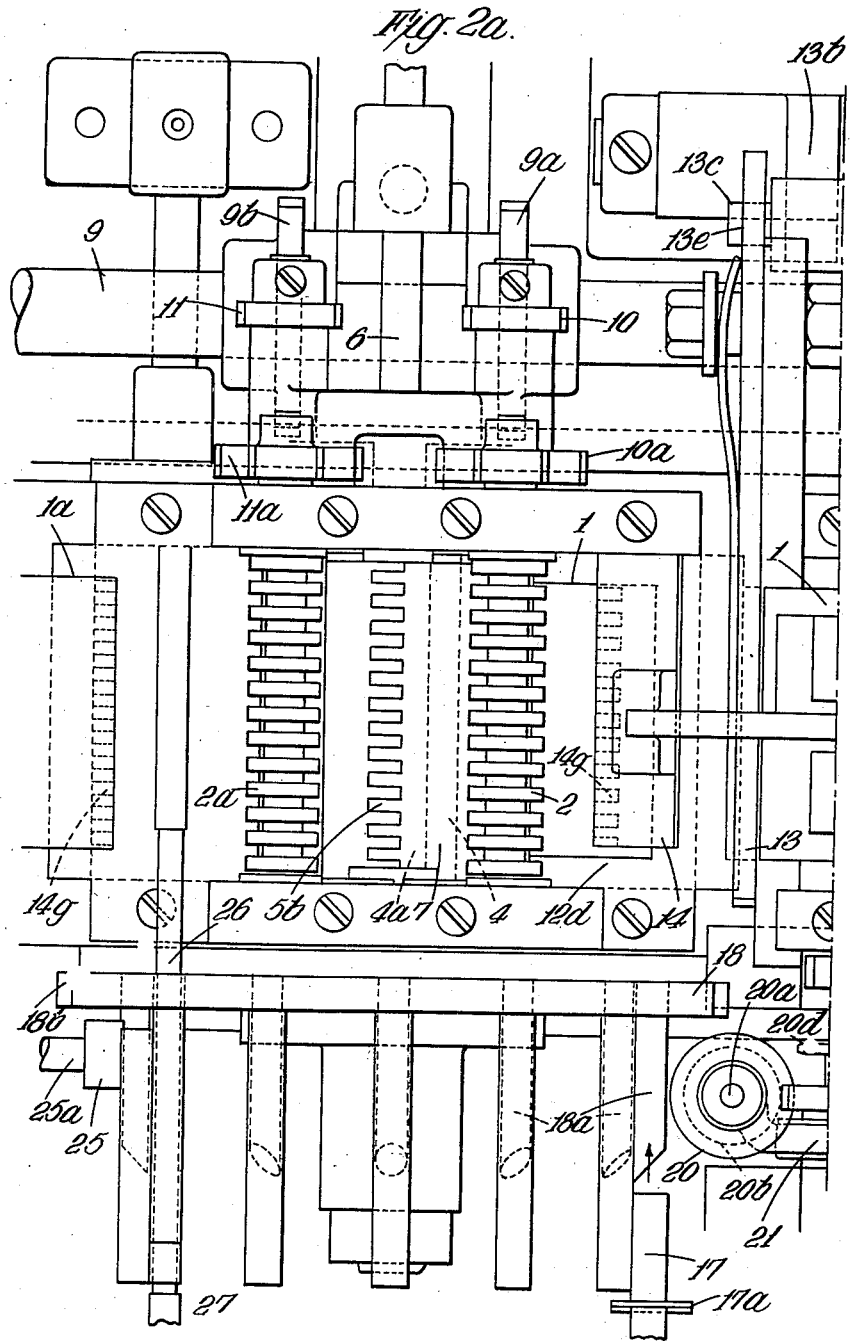

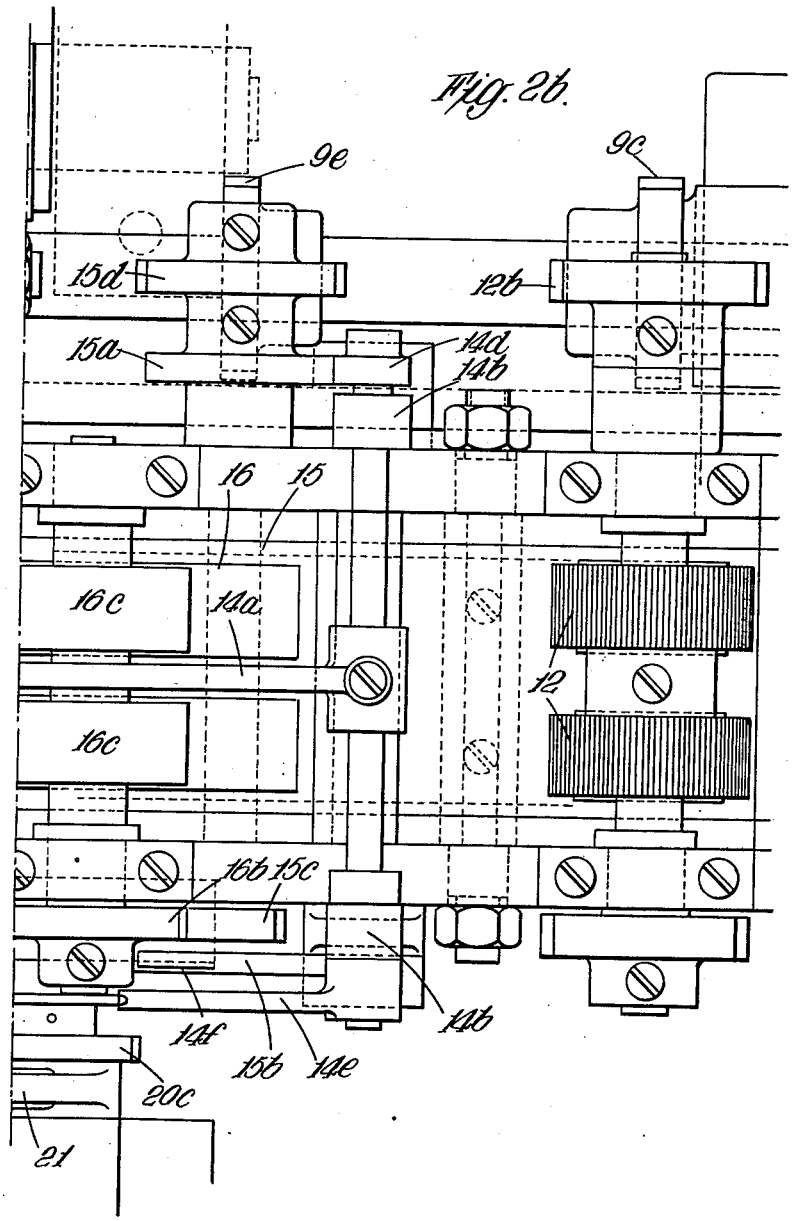

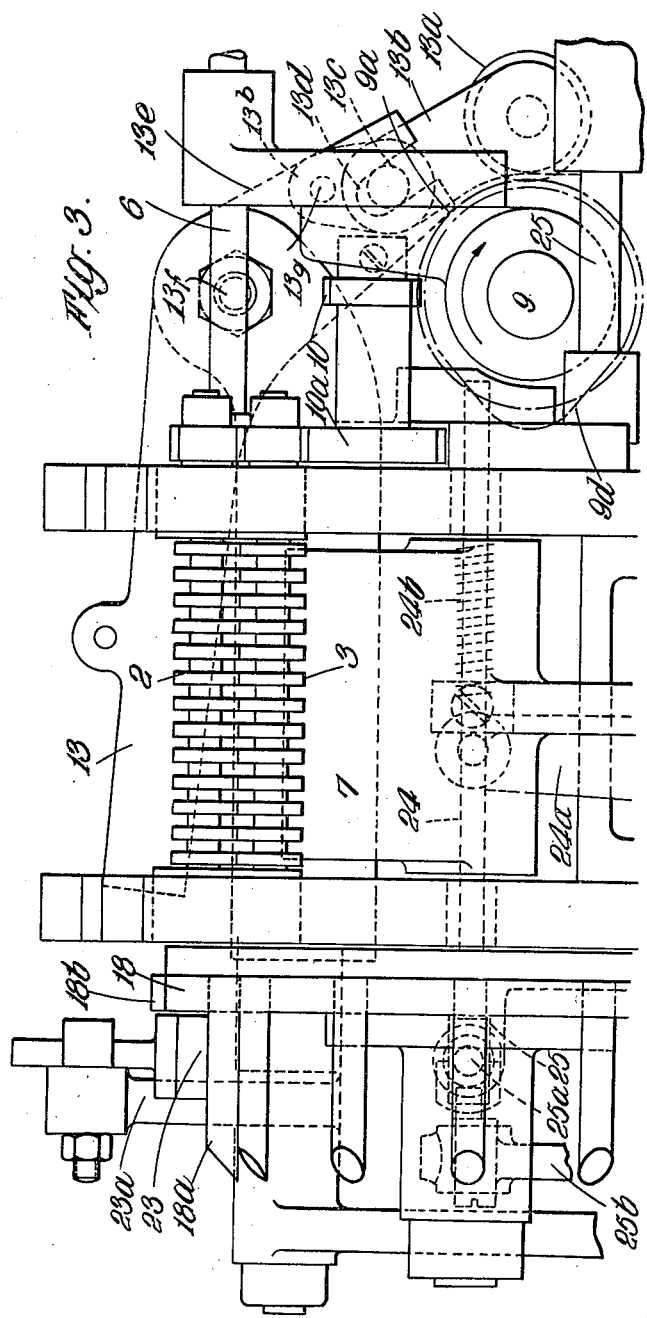

2,105,412

UNITED STATES PATENT OFFICE 2,105,412

MANUFACTURE OF CIGARETTES

William Frederick Maitland Edwards, London, England, assignor to Filter Tips Limited, London, England, a British company Application December 20, 1934, Serial No. 758,503
In Great Britain, December 23, 1933

13 Claims. (Cl. 93—1)

This invention relates to the manufacture of cigarettes and is concerned with an improved method and means for the production of so-called filter tips or fillings from strip material for use in the manufacture of filter tip cigarettes.

According to the present invention, the improved method for producing filter tips or fillings from strip material comprises feeding a length of strip material endwise into a receiving chamber in which the material, under the influence of the feeding movement, folds upon itself in more or less zigzag formation or is bunched together.

Preferably the strip material is of a width which is a multiple of the desired length of filter tip so that each length of filling produced may, by sub-division, provide a number of filter tips. Furthermore, it is preferred to enclose the length of filling in paper or other tubes or wrappers so that, if desired, they may be used subsequently in the production of filter tip cigarettes.

The invention furthermore includes apparatus comprising means adapted to act lengthwise on a strip of material of a length which is a multiple of the desired length of filter tip so as to bunch or fold the strip indeterminately upon itself and produce multiple length fillings of substantially circular cross-section, and means adapted to enclose such lengths of filling in paper or other tubes or wrappers.

Such wrapped multiple lengths of filling may be used in a hopper feed arrangement of any suitable kind associated with mechanism for producing filter tip cigarettes.

The invention is hereinafter described by way of example with reference to the accompanying diagrammatic drawings, in which:—

Figure 1, which consists of Figs. 1a and 1b taken together, is a view in side elevation illustrating a preferred embodiment of apparatus in accordance with the invention;

Figure 2 which consists of Figs. 2a and 2b taken together, is a plan view corresponding to Figure 1;

Figure 3 is a fragmentary right end elevation of the bunching mechanism shown in Figure 1;

Figure 4 is a fragmentary sectional elevation illustrating a modification in which the strip material is loosely folded or bunched by feed rollers co-operating with an elongated chamber;

Figures 5 and 6 are views in cross-section illustrating the manner in which the loosely folded or bunched strip is consolidated;

Figure 7 is an end elevation of a wrapped stick of filling in accordance with the invention;

Figure 8 is a side elevation corresponding to Figure 7;

Figure 1A:
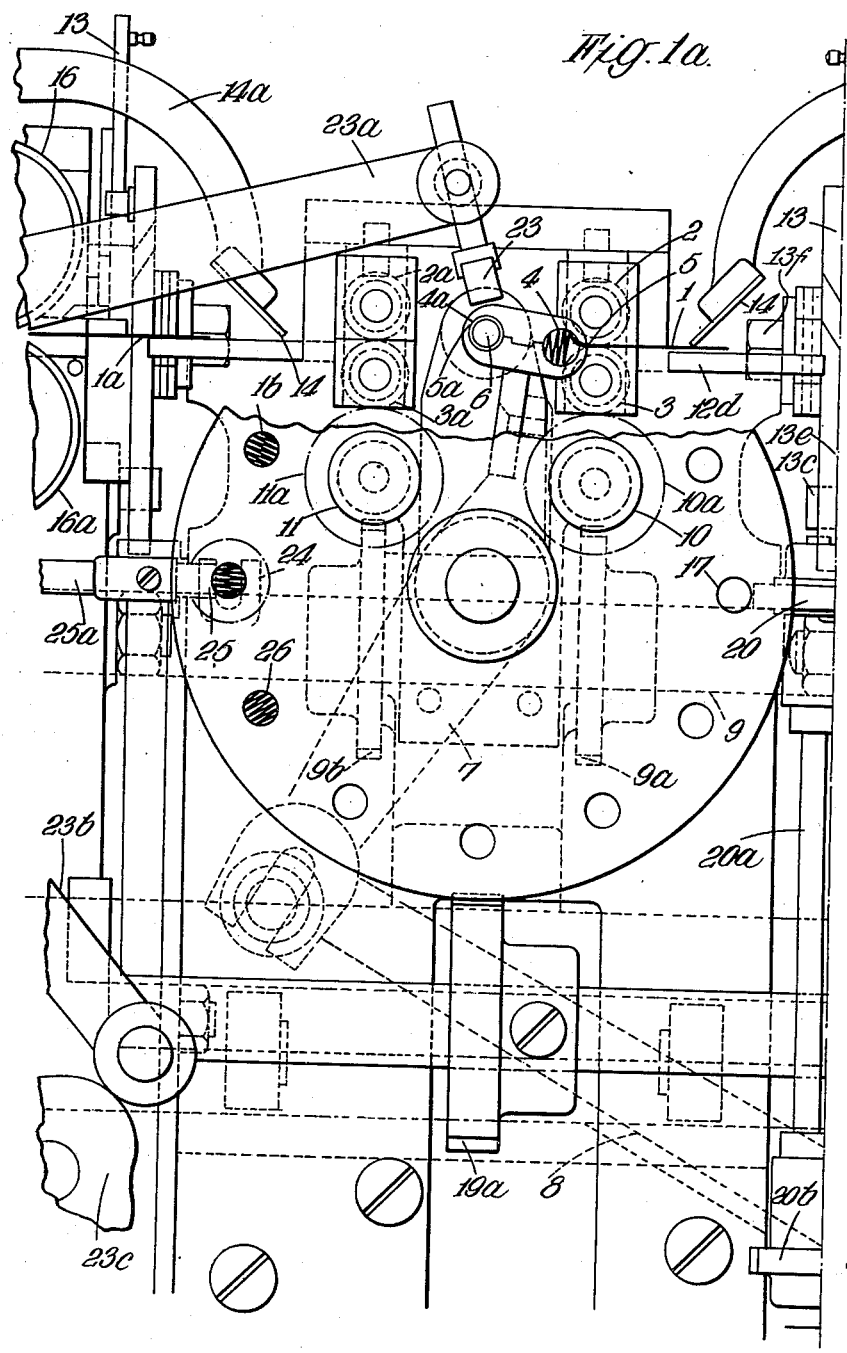

In carrying the invention into effect according to a simple construction, a length 1 of strip material is fed between a pair of circumferentially grooved feed rollers 2, 3 which are geared together and suitably driven, and the strip is thereby projected diametrically into a cylindrical receiving chamber 4 provided with a slot 5 at one side for the entry of the strip material and also with slots 5b (Figure 2a) for the accommodation of the rollers 2, 3 so that the latter can be disposed close to the chamber 4 with parts of their peripheries projecting slightly into the said chamber. As the strip 1 projected into the chamber intermediate its upper and lower walls strikes the end wall thereof it is deflected and during the continued feed into the chamber the strip is folded upon itself in an approximately zigzag or more or less regular formation, as shown, or is bunched together so as to fill the chamber.

In a preferred embodiment, two oppositely disposed feeding devices are provided in association with common ejecting means. Thus, a second pair of feed rollers 2a, 3a is arranged opposite to the rollers 2, 3 so as to co-operate with a chamber 4a having a slot 5a for the entry of the strip material 1a, such chamber 4a being slotted to accommodate the rollers 2a, 3a. The chambers 4, 4a are carried by an oscillatable lever 7 operated so that each chamber moves alternately from the position in which it is associated with the respective feed rollers into a position in which it is in alignment with a common ejecting plunger 6. The chambers 4, 4a furthermore are arranged so that while one chamber is associated with the respective pair of feed rollers, the other chamber is in alignment with the ejecting plunger and vice versa. The pairs of feed rollers 2, 3 and 2a, 3a may be driven respectively through gears 10a, 11a and gears 10, 11 meshing with gears 9a, 9b on a main longitudinally extending shaft 9.

Preferably the apparatus is adapted to produce lengths of filling which are a multiple of the desired length of filter tip and in order to ensure accurate feeding of the strip material square to the feed rollers 2, 3 or 2a, 3a to secure substantially uniform folding or bunching of the material throughout the length of filling produced, the strip is conveyed, cut off and fed to the aforesaid feed rollers by the means hereinafter described. The strip, which it will be understood is of a width which is a multiple of the desired length of filter tip, is led from a supply spool and moved forwards by a pair of co-operating feed rollers 12, 12a geared together and driven continuously by the co-operation of a gear 12b on the spindle of the lower roller and a gear 9c on the shaft 9. By the action of the rollers 12, 12a the strip material is fed along a guide and projected between a pair of rollers 16, 16a and beneath a cutter 13, the roller 16 being circumferentially slotted or grooved to accommodate a fixed guide 12c arranged to ensure the passage of the material beneath the knife 13. The rollers 16, 16a are formed with segmental slots 16c arranged so that during the projection of the strip between these rollers by the action of the rollers 12, 12a the rollers 16, 16a have no action on the strip. When a sufficient length of material has been projected beyond the knife 13 the latter is operated to cut off the leading length and immediately after the cutting operation the projecting segments of the rollers 16, 16a, which preferably have smooth peripheries, engage the strip in such manner as to exert a smoothing or straightening action thereon. The rollers 16, 16a are geared together and driven through gears 16b, 15c and 15d from a gear 9e on the shaft 9. The length cut off by the knife 13 and resting on a table 12d is fed forward at the correct moment into engagement with the respective feed rollers 2, 3 or 2a, 3a by means of a blade 14 carried by an arm 14a which is pivoted between a pair of arms 14b oscillatable about a pivot 14c by the engagement of a roller 14d with a cam 15a (Figure 1). The engagement of the blade 14 with the material is controlled by an arm 14e connected to the arm 14a and provided with a roller 14f co-operating with a cam 15b (Figure 1b) on the shaft 15. The cams 15a, 15b are so arranged that the blade 14 moves downwardly into engagement with the strip adjacent the leading edge thereof and then moves forwardly so as to present the said leading edge accurately between the feed rollers 2, 3, the leading edge of the blade 14 being formed with slots 14g to accommodate the projecting parts of the feed rollers 2, 3. The blade 14 rises clear of the strip on the return movement.

The knife 13 is pivoted about pin 13f and may be operated by means of a cam 9d acting on a roller 13a (Figure 3) on an arm 13b provided with a pin 13c engaging in a slot 13d in a downwardly extending part 13e of the knife or knife carrier. Arm 13b is pivoted about pin 13g.

Similar means are provided for feeding strip material to each pair of feed rollers 2, 3 and 2a, 3a.

The filling 1b formed in the chambers 4, 4a may be ejected by the plunger 6 and sub-divided prior to, during or after ejection so as to produce single or double length filter tips. Preferably, however, means are provided whereby the apparatus is adapted for the production of sticks of filling of the character described enclosed in paper tubes whereby the fillings may be stored, if desired, and used subsequently in the production of filter tip cigarettes by the employment of a suitable feed hopper arrangement. For this purpose a paper tube 17 (Figure 2) formed by any suitable means is cut by a cutter 17a and the leading length of the paper tube 17 is engaged with one of a series of spoons 18a projecting from a disc 18 which is intermittently rotated, for example, by the engagement of a cam disc 19a with suitable teeth 18b on the periphery of the disc, the cam disc 19a being provided on a shaft 19 driven from the shaft 9 by means of gearing (not shown). The length of paper tube may be carried on to the spoon 18a and butted against the disc 18 by the engagement of a friction roller 20 carried by an arm 21 and driven by a shaft 20a through gears 20b, 20c, sprocket 20d and chain 22. The spoons 18a with paper tubes applied thereon move successively into alignment with the projecting plunger 6 and at this position a gripper 23 (Figures 1 and 3) mounted on an arm 23a is adapted to hold the paper tube on the spoon while the ejection movement of the plunger 6 takes place, the gripper 23 conveniently being operated by means of an arm 23b and a cam 23c. Preferably the ejecting plunger 6 is arranged to move so as to discharge the length of filling clear of the respective chamber, but not to such an extent that the rear end of the length of filling would be flush with the respective end of the paper tube. The registration of the filling with respect to the paper tube conveniently is effected at a later stage position by means of a positioning plunger 24 operated by a lever 24a and cam (not shown) under the control of a return spring 24b, a gripper 25 being provided at this position to prevent movement of the paper tube in relation to the spoon 18a while the registration is being effected. The gripper 25 may be mounted on a rod 25a operated, for example, by means of an arm 25b (Figure 3) through any suitable cam mechanism (not shown).

The final ejection of the length of filling enclosed in the paper tube 17 may be effected by a plunger 26 which removes the filling and the paper tube from the spoon 18a and thereby produces a wrapped stick 27 (Figure 2) which may fall or be discharged on to a suitable conveyor or into a receptacle.

In a modification, as illustrated in Figures 4, 5 and 6, a chamber 4b of elongated formation in cross-section may have feed rollers 2, 3 associated therewith and arranged to feed the strip material 1 through a longitudinal slot 5c into the chamber 4b whereby the material assumes a loosely folded or bunched formation, for example as shown. Such loosely folded or bunched formation is ejected from the chamber 4b into a chamber 4c which may be constituted by an extension of the chamber 4b. In the chamber 4c the loosely folded or bunched strip 1 is acted on by a presser member 4d whereby it is consolidated as shown in Figure 6 to a substantially circular cross-section.

Figures 7 and 8 illustrate the products which is preferably produced and consisting of a multiple length of filling formed from strip material folded in approximately zigzag formation or bunched to a circular cross-section to provide the filling 1b which is enclosed in a paper tube 17. The multiple length stick 27 is of such length that it may be sub-divided as shown in Figure 8 to produce a corresponding number of filter tips.

Figure 9:
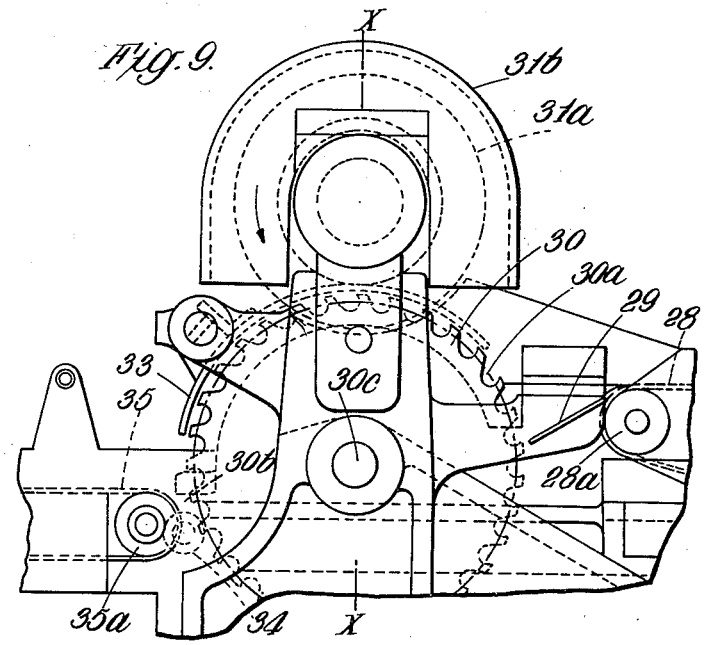
Figure 9 is a view in side elevation illustrating one embodiment of apparatus for trueing the ends of the lengths of filling produced.
Figure 10:
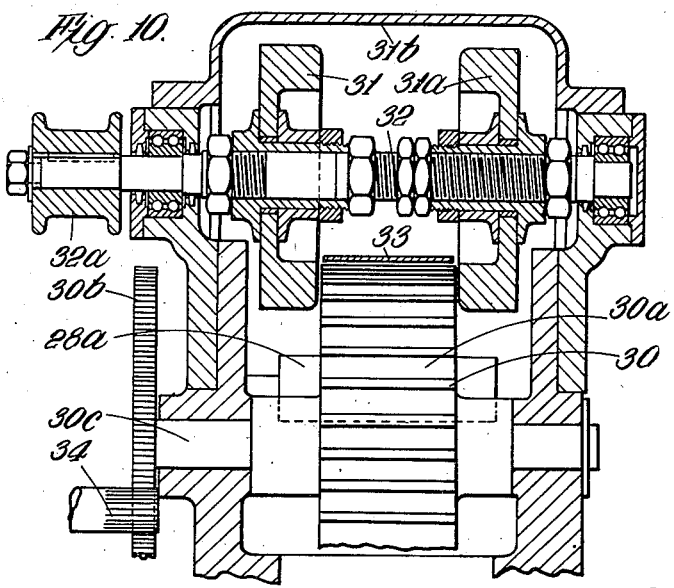
Figure 10 is a cross-section on the line X—X, Figure 9.

In the use of multiple length sticks of filling for the subsequent production of filter tip or like cigarettes, it may be of importance to ensure that the length of the multiple length sticks is exactly a multiple of the desired length of filter tip. For this purpose the wrapped sticks of filling discharged by the plunger 26 may be carried on a conveyor 28 (Figures 9 and 10) led over a pulley 28a and fed thereby down an inclined tray 29 into transverse channels 30a in the periphery of a drum 30 the width of which is less than the length of the wrapped sticks. The drum 30 carries the wrapped sticks between a pair of grinding wheels 31, 31a mounted on a spindle 32 driven at high speed as by means of a belt engaging a pulley 32a. Movement of the wrapped sticks out of the channels 30a during the grinding operation is prevented by means of a fixed guide 33. The drum 30 may be driven by the engagement of a gear 30b on the spindle 30c carrying the drum 30 with a pinion 34. After being traversed between the grinding wheels 31, 31a the wrapped sticks are discharged on to a conveyor 35 passing over a pulley 35a. Preferably the channels 30a are shaped as shown so as to facilitate the retention of the wrapped sticks in the channels against the action of the grinding wheels 31, 31a and furthermore to facilitate the discharge of the wrapped sticks on to the conveyor 35.

The invention is applicable for the production of filter tips from strip material of any suitable kind.

It will be understood that the invention is not limited to the particular embodiment hereinbefore described. For example, although the apparatus described is especially adapted for the production of multiple length sticks of filling, it may be modified for the production of single or double length filter tips from strip material of corresponding width.

What I claim is:—

1. A method for producing filter tips from strip material, which comprises feeding a length of strip material endwise into a receiving chamber until the strip engages a wall of the chamber, and continuing to feed the material in the same direction into the chamber to cause the strip to buckle and fold upon itself in substantially zigzag formation.

2. A method for producing filter tips from strip material, which comprises feeding a length of strip material diametrically into a cylindrical chamber until the end of the strip engages the inner cylindrical wall of said chamber, continuing to feed said strip in the same direction into the chamber to cause the strip to buckle and fold upon itself in substantially zigzag formation, and further continuing to feed the strip in the same direction into said chamber until a compact body is formed therein.

3. A method for producing filter tips from strip material, which comprises feeding a length of strip material endwise into a receiving chamber until the strip engages a wall of the chamber, continuing to feed the material into the chamber to cause the strip to buckle and fold upon itself in substantially zigzag formation, shifting said chamber to a position to discharge the formation therefrom, and while said formation is being discharged simultaneously producing a similar formation in another chamber.

4. A method for producing filter tips from strip material, which comprises feeding a length of strip material intermediately between the upper and lower walls of an elongated chamber until the strip engages the end wall thereof, continuing to feed the strip into the chamber to cause the strip to buckle and fold upon itself in substantially zigzag formation, introducing a plunger into said chamber, and forcing the zigzag formation against said end wall to produce a compact body.

5. A method for producing filter tips from strip material, which comprises feeding a length of strip material endwise into a receiving chamber until the strip engages a wall of the chamber, continuing to feed the material in the same direction into the chamber to cause the strip to buckle and fold upon itself in substantially zigzag formation, and discharging said formation from said chamber into a tubular casing.

6. A method for producing filter tips from strip material, which comprises feeding a length of strip material diametrically into a cylindrical chamber until the end of the strip engages the inner wall of said chamber, continuing to feed said strip in the same direction into the chamber to cause the strip to buckle and fold upon itself in substantially zigzag formation, further continuing to feed the strip in the same direction into said chamber until a compact body is formed therein, and discharging said compact body from said chamber into a tubular casing.

7. A method for producing filter tips from strip material, which comprises feeding a length of strip material intermediately between the upper and lower walls of an elongated chamber until the strip engages the end wall thereof, continuing to feed the strip into the chamber to cause the strip to buckle and fold upon itself in substantially zigzag formation, introducing a plunger into said chamber, forcing the zigzag formation against said end wall to produce a compact body, and discharging said compact body from said chamber into a tubular casing.

8. An apparatus for the production of filter tips from strip material, comprising a cylindrical chamber having a longitudinal slot in one side, and means for feeding a strip of a length greater than the diameter of said chamber lengthwise through said slot diametrically into said chamber against the interior cylindrical surface opposite said slot to cause the strip, fed into said chamber and of a length greater than the diameter of the chamber, to buckle and fold upon itself in a substantially zigzag formation.

9. An apparatus for the production of filter tips from strip material, comprising a chamber having spaced top and bottom walls, an imperforate side wall and a side wall provided with a longitudinal slot extending parallel to and intermediate said top and bottom wall, means for feeding a strip of material of a length greater than the distance between said side walls, through said slot in a path intermediate said top and bottom walls, against said imperforate side wall to cause the strip to buckle and fold upon itself in a substantially zigzag formation, and a plunger adapted to enter said chamber in the same direction in which the strip is fed and press the zigzag formation against said imperforate wall to form a compact body.

10. In an apparatus of the character described, a chamber having a slot in one side thereof, and means for gripping and feeding a strip through said slot into said chamber, said gripping and feeding means projecting into said chamber so that the strip will pass into the chamber before buckling.

11. An apparatus for the production of filter tips from strip material, comprising a cylindrical chamber having a longitudinal slot in one side, a pair of feed rollers mounted on axes parallel to the axis of said chamber adjacent said slot, ribs formed on the circumference of said rollers for gripping and feeding a strip of material through said slot diametrically into said chamber against the interior wall opopsite said slot to cause the strip to buckle and fold upon itself in a substantially zigzag formation, and the wall of said chamber adjacent said slot being provided with circumferentially extending slots to accommodate the ribs on the rollers and enable the point of engagement between the ribs on the rollers to be immediately adjacent the slot to avoid buckling of the strip before entry into the chamber.

12. An apparatus for the production of filter tips from strip material, comprising a cylindrical chamber having a longitudinal slot in one side, means for feeding a strip of a length greater than the diameter of said chamber through said slot diametrically into said chamber against the interior surface opposite said slot to cause the strip to buckle and fold upon itself in a substantially zigzag formation, means for ejecting the formation from said chamber, and means for alternately shifting said chamber from a position to receive a strip from the feed means to a position to cooperate with the ejecting means.

13. An apparatus for the production of filter tips from strip material, comprising a cylindrical chamber having a longitudinal slot in one side, means for feeding a strip of a length greater than the diameter of said chamber through said slot diametrically into said chamber against the interior surface opposite said slot to cause the strip to buckle and fold upon itself in a substantially zigzag formation, means for ejecting the formation from said chamber, a second chamber and feed means identical to the aforesaid chamber and feed means, ejecting means common to said chambers for ejecting formations therefrom, and means carrying both of said chambers for alternately shifting said chambers to positions in which one chamber cooperates with its feed means and the other chamber cooperates with the ejecting means.

WILLIAM FREDERICK MAITLAND EDWARDS.